United States Patent
Ayan et al.

(10) Patent No.: US 9,805,718 B2
(45) Date of Patent: Oct. 31, 2017

(54) CLARIFYING NATURAL LANGUAGE INPUT USING TARGETED QUESTIONS

(71) Applicant: SRI International, Menlo Park, CA (US)

(72) Inventors: Necip Fazil Ayan, Palo Alto, CA (US); Arindam Mandal, San Mateo, CA (US); Jing Zheng, San Jose, CA (US)

(73) Assignee: SRI INTERNAITONAL, Menlo Park, CA (US)

( * ) Notice: Subject to any disclaimer, the term of this patent is extended or adjusted under 35 U.S.C. 154(b) by 1070 days.

(21) Appl. No.: 13/866,509

(22) Filed: Apr. 19, 2013

(65) Prior Publication Data

US 2014/0316764 A1    Oct. 23, 2014

(51) Int. Cl.
G06F 17/27 (2006.01)
G10L 15/18 (2013.01)
G10L 15/24 (2013.01)
G10L 15/22 (2006.01)
H04M 3/493 (2006.01)

(52) U.S. Cl.
CPC .......... *G10L 15/22* (2013.01); *G06F 17/2785* (2013.01); *G10L 15/24* (2013.01); *H04M 3/4936* (2013.01); *G10L 15/1815* (2013.01); *G10L 2015/225* (2013.01)

(58) Field of Classification Search
CPC ..... G10L 15/22; G10L 15/24; G10L 15/1815; G06F 17/2785; G06F 17/27
See application file for complete search history.

(56) References Cited

U.S. PATENT DOCUMENTS

| | | | | |
|---|---|---|---|---|
| 5,272,571 A | * | 12/1993 | Henderson | B41J 3/26 178/21 |
| 5,500,920 A | * | 3/1996 | Kupiec | G10L 15/22 704/270.1 |
| 5,884,249 A | * | 3/1999 | Namba | G06F 17/271 704/275 |
| 5,905,789 A | * | 5/1999 | Will | H04M 1/271 379/211.03 |

(Continued)

FOREIGN PATENT DOCUMENTS

| | | |
|---|---|---|
| EP | 1855186 A2 | 11/2007 |
| WO | 2011028842 A2 | 3/2011 |
| WO | 2011028844 A2 | 3/2011 |

OTHER PUBLICATIONS

International Search Report for Application No. PCT/US2010/047584, dated May 18, 2011, 4 pages.

(Continued)

*Primary Examiner* — Eric Yen
(74) *Attorney, Agent, or Firm* — Hickman Palermo Becker Bingham LLP

(57) ABSTRACT

A dialog assistant embodied in a computing system can present a clarification question based on a machine-readable version of human-generated conversational natural language input. Some versions of the dialog assistant identify a clarification target in the machine-readable version, determine a clarification type relating to the clarification target, present the clarification question in a conversational natural language manner, and process a human-generated conversational natural language response to the clarification question.

39 Claims, 5 Drawing Sheets

(56) References Cited

U.S. PATENT DOCUMENTS

| | | | | |
|---|---|---|---|---|
| 5,963,641 | A * | 10/1999 | Crandall | G06F 17/273 358/1.1 |
| 5,991,721 | A * | 11/1999 | Asano | G10L 15/183 704/239 |
| 6,037,976 | A | 3/2000 | Wixson | |
| 6,243,669 | B1 * | 6/2001 | Horiguchi | G06F 17/271 704/257 |
| 6,321,371 | B1 * | 11/2001 | Yount, Jr. | G06F 17/5068 716/112 |
| 6,374,220 | B1 * | 4/2002 | Kao | G10L 15/08 704/242 |
| 6,393,389 | B1 * | 5/2002 | Chanod | G06F 17/271 704/4 |
| 6,405,162 | B1 * | 6/2002 | Segond | G06F 17/2785 704/9 |
| 6,480,819 | B1 * | 11/2002 | Boman | G10L 15/26 704/257 |
| 6,519,562 | B1 * | 2/2003 | Phillips | G10L 15/1815 704/240 |
| 6,556,963 | B1 * | 4/2003 | Tetzlaff | G06F 19/3475 235/375 |
| 6,615,178 | B1 * | 9/2003 | Tajima | G06F 17/2705 704/10 |
| 6,742,021 | B1 | 5/2004 | Halverson et al. | |
| 6,757,718 | B1 | 6/2004 | Halverson et al. | |
| 6,771,756 | B1 * | 8/2004 | Chou | G06Q 10/10 379/201.01 |
| 6,859,931 | B1 | 2/2005 | Cheyer et al. | |
| 6,965,857 | B1 * | 11/2005 | Decary | G06F 17/2705 704/1 |
| 7,069,560 | B1 | 6/2006 | Cheyer et al. | |
| 7,139,717 | B1 * | 11/2006 | Abella | G10L 15/1822 704/251 |
| 7,302,383 | B2 | 11/2007 | Valles | |
| 7,502,737 | B2 * | 3/2009 | Sharma | G10L 15/08 704/251 |
| 7,835,578 | B2 | 11/2010 | Cheng et al. | |
| 8,606,568 | B1 * | 12/2013 | Tickner | G10L 15/1815 704/231 |
| 8,719,026 | B2 * | 5/2014 | Kennewick | G06Q 30/0261 704/255 |
| 8,793,137 | B1 * | 7/2014 | Roy | G10L 15/22 704/255 |
| 8,868,409 | B1 * | 10/2014 | Mengibar | G10L 15/26 704/10 |
| 2001/0017632 | A1 | 8/2001 | Goren-Bar | |
| 2001/0041978 | A1 * | 11/2001 | Crespo | G10L 15/1815 704/257 |
| 2002/0087310 | A1 * | 7/2002 | Lee | G06Q 30/06 704/251 |
| 2002/0173946 | A1 * | 11/2002 | Christy | G06F 17/2872 704/2 |
| 2002/0178005 | A1 * | 11/2002 | Dusan | G06F 17/271 704/254 |
| 2002/0193991 | A1 * | 12/2002 | Bennett | G10L 15/32 704/247 |
| 2003/0004714 | A1 * | 1/2003 | Kanevsky | G10L 15/22 704/231 |
| 2003/0009321 | A1 * | 1/2003 | Attwater | G07C 9/00158 704/6 |
| 2003/0125948 | A1 * | 7/2003 | Lyudovyk | G10L 15/183 704/257 |
| 2003/0233230 | A1 * | 12/2003 | Ammicht | G10L 15/183 704/235 |
| 2004/0167778 | A1 * | 8/2004 | Valsan | G10L 15/16 704/231 |
| 2005/0038647 | A1 * | 2/2005 | Baker | G10L 15/065 704/231 |
| 2005/0055209 | A1 * | 3/2005 | Epstein | G10L 15/1815 704/255 |
| 2006/0064431 | A1 | 3/2006 | Kishore et al. | |
| 2006/0190258 | A1 * | 8/2006 | Verhasselt | G10L 15/083 704/255 |
| 2006/0218115 | A1 * | 9/2006 | Goodman | G06F 17/241 |
| 2007/0099602 | A1 | 5/2007 | Kurlander et al. | |
| 2007/0288439 | A1 | 12/2007 | Rappaport et al. | |
| 2008/0091406 | A1 * | 4/2008 | Baldwin | G10L 15/22 704/4 |
| 2008/0154591 | A1 * | 6/2008 | Kujirai | G10L 15/22 704/231 |
| 2008/0262909 | A1 | 10/2008 | Li et al. | |
| 2008/0263038 | A1 * | 10/2008 | Judge | G06F 17/2775 |
| 2008/0281598 | A1 * | 11/2008 | Eide | G10L 15/22 704/270 |
| 2008/0313119 | A1 * | 12/2008 | Leskovec | G06F 17/30722 706/46 |
| 2009/0055176 | A1 * | 2/2009 | Hu | G10L 15/08 704/240 |
| 2009/0058860 | A1 * | 3/2009 | Fong | G06F 17/211 345/467 |
| 2009/0070103 | A1 * | 3/2009 | Beggelman | G06F 17/27 704/9 |
| 2009/0164431 | A1 | 6/2009 | Zivkovic et al. | |
| 2009/0187425 | A1 * | 7/2009 | Thompson | G06F 19/3443 705/3 |
| 2009/0204599 | A1 | 8/2009 | Morris et al. | |
| 2009/0254539 | A1 | 10/2009 | Wen et al. | |
| 2009/0271199 | A1 * | 10/2009 | Agapi | G10L 15/22 704/251 |
| 2009/0300003 | A1 * | 12/2009 | Suzuki | G06F 17/30616 |
| 2010/0030551 | A1 * | 2/2010 | Ark | G06F 17/2735 704/8 |
| 2010/0057456 | A1 * | 3/2010 | Grigsby | G10L 15/22 704/235 |
| 2010/0145694 | A1 * | 6/2010 | Ju | G10L 15/1815 704/235 |
| 2010/0146559 | A1 | 6/2010 | Lee et al. | |
| 2011/0137654 | A1 * | 6/2011 | Williams | G10L 15/14 704/257 |
| 2011/0288867 | A1 * | 11/2011 | Chengalvarayan | G10L 15/063 704/251 |
| 2012/0016678 | A1 * | 1/2012 | Gruber | G06F 17/3087 704/275 |
| 2012/0245944 | A1 | 9/2012 | Gruber et al. | |
| 2012/0303371 | A1 * | 11/2012 | Labsky | G10L 13/08 704/260 |
| 2012/0313854 | A1 | 12/2012 | Senanayake et al. | |
| 2013/0046544 | A1 * | 2/2013 | Kay | G06F 3/04883 704/275 |
| 2013/0152092 | A1 | 6/2013 | Yadgar et al. | |
| 2014/0012575 | A1 * | 1/2014 | Ganong, III | G10L 15/1815 704/239 |
| 2014/0074470 | A1 * | 3/2014 | Jansche | G10L 15/187 704/244 |
| 2014/0278379 | A1 * | 9/2014 | Coccaro | G10L 15/1815 704/202 |

OTHER PUBLICATIONS

U.S. Appl. No. 13/314,965 to Yadgar, filed Dec. 8, 2011, 43 pages.
"Beyond Siri: The next frontier in User Interfaces, How virtual assistants are disrupting search and access to connected screens," Vision Mobile, Jun. 2012, 24 pages.
Zancanaro, et al., "A Discussion on Augmenting and Executing SharedPlans for Multimodal Communication," 7 pages.
Cheyer, et al., "A Unified Framework for Constructing Multimodal Experiments and Applications," 7 pages.
Hernandez, et al., "Dialoguing With an Online Assistant in a Financial Domain: The VIP-Advisor Approach," 10 pages.
Winarsky, et al., "The Future of the Virtual Personal Assistant," Mar. 25, 2012, 3 pages.
"What does it take for mobile personal assistant to "understand" us?" Jan. 5, 2012, 5 pages.
Dowding, et al., "Interleaving Syntax and Semantics in an Efficient Bottom-Up Parser," 7 pages.

(56) References Cited

OTHER PUBLICATIONS

Nitz et al., U.S. Appl. No. 13/585,003, "Method, System, and Device for Inferring a Mobile User's Context and Proactively Providing Assistance," filed Aug. 14, 2012, 63 pages.
U.S. Appl. No. 13/399,210 to Senanayake et al., filed Feb. 17, 2012, 40 pages.
U.S. Appl. No. 13/484,520 to Sawhney et al., filed May 31, 2012, 44 pages.
Wolverton et al., U.S. Appl. No. 13/678,209, "Vehicle Personal Assistant," filed Nov. 15, 2012, 70 pages.
Ayan et al., "'Can You Give Me Another Word for Hyperbaric?': Improving Speech Translation Using Targeted Clarification Questions," Proceedings from International Conference on Acoustics, Speech, and Signal Processing, May 26-31, 2013, Vancouver, Canada, 5 pages.
Wolverton et al., U.S. Appl. No. 13/678,213, "Vehicle Personal Assistant," filed Nov. 15, 2012, 66 pages.
Nitz et al., U.S. Appl. No. 13/585,008, "Method, System, and Device for Inferring a Mobile User's Context and Proactively Providing Assistance," filed Aug. 14, 2012, 63 pages.
International Search Report for Application No. PCT/US2010/047588, dated May 2, 2011, 4 pages.

\* cited by examiner

CLARIFYING NATURAL LANGUAGE INPUT USING TARGETED QUESTIONS

GOVERNMENT RIGHTS

This invention was made in part with government support under contract number HR0011-12-C-0016 awarded by the Defense Advanced Research Projects Agency (DARPA). The Government has certain rights in this invention.

BACKGROUND

Human-machine dialog systems can enable natural language interactions between humans and machines. Typically, these systems convert the human natural language input into a machine-readable form. In some cases, these systems may include automatic error detection algorithms, which attempt to identify segments of the machine-readable version of the input that contain errors. If an error is detected, these systems may utilize a simple error correction mechanism that only addresses specific, obvious types of errors and only responds to the detected errors with non-specific requests to "please rephrase" the input.

SUMMARY

According to at least one aspect of this disclosure, a dialog assistant is embodied in one or more machine readable storage media and accessible by a computing system to conduct a clarification dialog with a user, by identifying a clarification target, the clarification target comprising a machine-readable version of a portion of a human-generated conversational natural language input needing clarification, the clarification target being less than the whole input; determining a clarification type relating to the clarification target, the clarification type indicating a type of clarification needed to clarify the intended meaning of the clarification target; presenting a conversational natural language clarification question based on the clarification type, the clarification question referring to the clarification target; and processing a human-generated conversational natural language response to the clarification question to clarify the intended meaning of the clarification target.

In some embodiments of the dialog assistant, the human-generated conversational natural language input may include human-spoken conversational natural language input. The human-generated conversational natural language response may include human-spoken conversational natural language input. The conversational natural language clarification question may include machine-generated spoken conversational language output. The computing system may include a mobile electronic device. In some embodiments, the dialog assistant may present the clarification question at the computing system in a spoken natural language form.

In some embodiments, the dialog assistant may play at least a portion of the human-generated conversational natural language input through a speech synthesizer as part of the clarification question. The dialog assistant may analyze the response and determine, based on the analysis of the response, whether to generate another clarification question. The dialog assistant may extract an answer relating to the clarification target from the response and to modify the input by replacing at least a portion of the clarification target with a machine-readable version of at least a portion of the answer. The dialog assistant may generate a new version of the input based on at least a portion of the clarification target. The clarification target may include a proper noun, a mispronunciation, a homophone, and/or an idiom. The dialog assistant may generate the clarification question by applying a clarification question template based on the clarification target and the clarification type. The dialog assistant may generate the clarification question to request that the response include the spelling of a word in the clarification target. The dialog assistant may generate the clarification question to request that the response include another word or phrase having a similar meaning to a word in the clarification target. The dialog assistant may generate the clarification question to present a plurality of homophones and request that the response indicate whether any of the homophones is the same as a word in the clarification target. The dialog assistant may generate the clarification question to present a word sense and request that the response indicate whether the word sense corresponds to the meaning of a word in the clarification target. The dialog assistant may generate the clarification question to include the input and replace a word of the clarification target with an interrogative pronoun. The dialog assistant may select the interrogative pronoun based on an attribute assigned to the clarification target by a software application. The dialog assistant may generate the clarification question to include the clarification target and request that the response confirm the accuracy of the clarification target. The dialog assistant may generate a plurality of clarification questions based on the clarification target, select one clarification question from the plurality of clarification questions, and present the selected clarification question at the computing system in a natural language form.

In some embodiments, the dialog assistant may analyze the response to the selected clarification question, select another clarification question from the plurality of clarification questions based on the analysis of the response, and present the other clarification question at the computing system in a natural language form. The dialog assistant may identify a plurality of different clarification targets in the input and generate a plurality of different clarification questions corresponding to the different clarification targets. The dialog assistant may process human-generated conversational natural language responses to each of the clarification questions to clarify the intended meaning of the clarification target. The dialog assistant may include an output of one or more of an automatic speech recognition system and a statistical machine-translation system. The machine-readable version of the human-generated conversational natural language input may include one or more attributes assigned to the input by the automatic speech recognition system or the statistical machine-translation system, and the dialog assistant may generate the clarification question based on the one or more attributes assigned to the input. The clarification type may include one of a plurality of clarification types including an out-of-vocabulary phrase, an out-of-vocabulary word, an ambiguous phrase, and an ambiguous word and the clarification question may include one of a plurality of clarification questions including clarification questions relating to each of the clarification types.

In some embodiments, the dialog assistant may be embodied in a virtual personal assistant. The dialog assistant may conduct the clarification dialog to clarify the input before the input is further processed by the virtual personal assistant. In some embodiments, the dialog assistant may be embodied in a speech translation system. The dialog assistant may conduct the clarification dialog to clarify the input before the input is further processed by the speech translation system.

According to at least one aspect of this disclosure, a method for conducting a clarification dialog with a user includes, with a computing system: identifying a clarification target, the clarification target comprising a portion of a machine-readable version of a human-spoken conversational natural language input needing clarification, the clarification target being less than the whole input; determining a clarification type relating to the clarification target, the clarification type indicating a type of clarification needed to clarify the intended meaning of the clarification target; presenting a machine-generated spoken conversational natural language clarification question based on the clarification type, the clarification question referring to the clarification target; and processing a human-spoken conversational natural language response to the clarification question to clarify the intended meaning of the clarification target. Embodiments of the method may include modifying the input to replace at least a portion of the clarification target with a machine-readable version of the response.

In some embodiments, a computing device includes a processor; and a memory having stored therein a plurality of instructions that when executed by the processor cause the computing device to perform any of the foregoing methods. In some embodiments, machine readable storage media includes instructions stored thereon that in response to being executed result in a computing device performing any of the foregoing methods.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
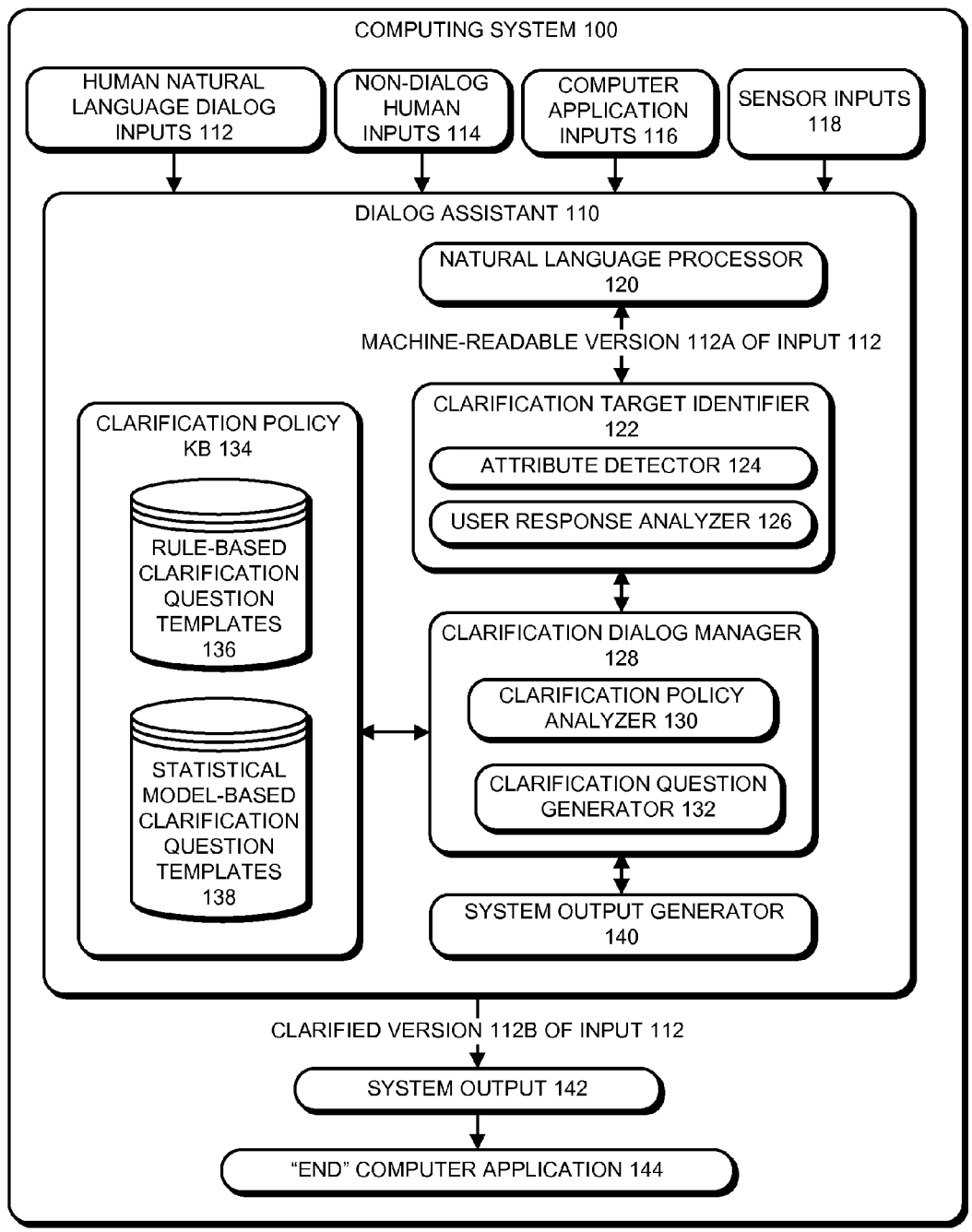
FIG. 1 is a simplified module diagram of at least one embodiment of a computing system including a dialog assistant to analyze human-generated conversational natural language input.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Natural language communication between a human and a machine involves several challenges. The complexity, ambiguity, and informality commonly associated with natural language communications can significantly reduce the clarity of the input and therefore impact the performance of human-machine dialog systems. Further, a person's intent is often conveyed by the context in which something is said and how it is said, in addition to the explicit language itself. State-of-the art linguistic tools and algorithms may be adequate for simple and formal communications (e.g., edited data such as news stories), but their performance degrades significantly with, for example, spontaneous and/or unedited natural language input, which can often include out-of-vocabulary and ambiguous words and phrases. These types of natural language inputs, if not quickly and accurately clarified, can disrupt the human-machine interaction, leading to a poor user experience and an ineffective system response.

Referring now to FIG. 1, a dialog assistant 110 is embodied in a computing system 100 as computer software, hardware, firmware, or a combination thereof. As described further in connection with FIG. 5, the computing system 100 may be embodied as any suitable computing device or combination of networked computing devices. The illustrative dialog assistant 110 can receive, via, e.g., an input-output device or interface, and utilize a number of different forms of input, including human natural language dialog inputs 112 (e.g., spoken or textual words and phrases), non-dialog human-generated inputs (e.g., non-dialog keyboard, keypad, or touch screen inputs, mouse clicks, gestures, and/or others), computer application inputs 116 (e.g., data and/or instructions passed by an "end" computer application 144 to the dialog assistant 110, through an application programming interface, for example), and sensor inputs 118 (e.g., electrical signals embodying sensed information such as geographic location, motion, temperature, activity, biometric data, etc.)

When a human natural language dialog input 112 is received by the computing system 100, or another event occurs that triggers a clarification dialog, the dialog assistant 110 initiates clarification of the input 112 as needed. Embodiments of the dialog assistant 110 identify one or more specific portions of the input 112 that need clarification, ask the user targeted clarification questions that are focused on those regions of the input 112 that need clarification, and formulate a clarified version 112B of the user's original input 112, either by combining the user's responses to the clarification questions with the original input 112 or formulating an entirely new version of the user's input (e.g., by restating or rephrasing the input 112). Some embodiments of the dialog assistant 110 can autonomously (e.g., automatically, without any clarification questions or user responses thereto) generate a clarification of the user's input 112 where appropriate, based on, for example, a previous history of clarifications, statistical dialog models, and/or other computerized intelligence that is made available to the dialog assistant 110. As used herein, "natural language" refers to words, phrases, verbal expressions, and/or combinations thereof formulated by a human, device, or system in a fashion that is or is intended to approximate or simulate speech that normally arises in an unpremeditated fashion as the result of the innate facility for language possessed by the human intellect (as distinguished from, for example, structured computer programming languages or code). Terms such as "dialog" and "conversational" generally refer to the use of natural language (e.g., spoken or written) in the context of a communicative exchange of information, ideas, opinions, sentiments, observations, questions and answers, statements and responses, or the like.

As used herein, terms such as "clarification," "clarify," and the like refer to the efforts initiated by the dialog assistant 110 to correct errors, resolve ambiguities, understand idioms, determine the meaning of out-of-vocabulary words and phrases, and/or undertake other clarifying initiatives to understand more clearly the user's intended meaning of the input 112. As used herein, a "clarification target," may refer to any portion of the user's input 112 or the machine-readable version 112A of the input 112 (e.g., less than the entire input 112/112A) with respect to which the dialog assistant 110 has identified a need for clarification. For example, the user's original input 112 may have been clear, but the system 112A was unable to recognize a portion of it, and so the machine-readable version 112A may need to be clarified. Alternatively or in addition, the user's original input may not have been clear (as may be the case if background noise or other user activity (e.g., pauses, throat clearing, etc.) interferes with the system 100's ability to receive the input 112, and consequently, both the input 112 and the machine-readable version 112A need clarification. As used herein, a "clarification question," may refer to any type of natural language system output (e.g., questions, statements, words, phrases, etc.) and/or other system output that is intended to or can be interpreted as requesting further input 112 from the user relating to a clarification target.

The dialog assistant 110 can make the clarified version 112B of the input 112 available to one or more of the end computer applications 144, such as other computer systems, software applications, modules, and the like, for further processing or analysis (e.g., as system output 142). For example, in some embodiments, the dialog assistant 110 may be incorporated into or interface with a virtual personal assistant (VPA) or similar type of computerized application that enables natural language dialog between a person and a computing device in order to achieve a goal or objective of the user (e.g., to conduct a search for information or perform a task, like updating a calendar entry, generating driving directions to a specific geographic location, or making an online reservation at a restaurant). In the VPA context, the dialog assistant 110 may be used to clarify the intended meaning of the input 112 before the virtual personal assistant determines an appropriate task or tasks to perform in response to the input 112. As an example, all or portions of the dialog assistant 110 may be incorporated into an ASR module or a natural language understanding (NLU) module of a VPA application. In other embodiments, the dialog assistant 110 may be incorporated into or interface with a machine translation (MT) program, to correct errors or otherwise clarify the intended meaning of the input 112 before the input 112 is translated from its original human-generated natural language into another human-generated natural language by the machine translation program. In some cases, the dialog assistant 110 may be embodied as a "generic" architecture for human-machine dialog clarification, which can be incorporated into, linked to, or referenced by a variety of different types of computer applications, including, but not limited to, web search engines, telephone reservation systems, and/or others.

The dialog assistant 110 analyzes the human natural language dialog inputs 112 to identify and classify clarification targets. In some embodiments, the dialog assistant 110 may engage in more than one round of communicative exchanges (e.g., conversational dialog with multiple rounds) with the user, in order to seek clarification of one or more clarification targets. As such, the dialog assistant 110 may determine whether a current input 112 relates to previous round of the same conversation or constitutes the beginning of a new conversation. Further, in some embodiments, the dialog assistant 110 may analyze one or more of the non-dialog human inputs 114, the inputs 116 from one or more end computer applications 144, the sensor inputs 118, or a combination of any of these, in conjunction with the natural language inputs 112.

As an example, if the user's input 112 includes a statement such as "bring me the ball over there," an audiovisual system or augmented reality system may, using, e.g., a visual or kinetic sensor, observe physical motion or gestures performed by the user, such as the user waving or pointing at objects in a room. From that sensed information, the system may determine the two- or three-dimensional coordinates of the location to or about which the user is gesturing. These coordinates may take the form of, for example, inputs 116 or 118, and may be passed (e.g., as arguments or parameters) to the dialog assistant 110. The dialog assistant 110 may incorporate such location information into the clarified version 112B of the user's input 112 (e.g., by string manipulation techniques such as parsing and concatenation). For instance, the phrase "over there" may be identified as a clarification target (ambiguous statement), and replaced with the location coordinates associated with the user's gesture in the clarified version 112B of the user's input. The location clarification may take the form of "raw" data, coordinate data converted to an alphanumeric string value, semantic information, or a natural-language expression representing those coordinates, such as "in the southwest corner of the room," for example, depending on the requirements of the particular end application.

The sensor inputs 118 may be generated by or derived from sensors that are embodied in or in communication with the computing system 100 from time to time during the operation of the computing system 100. In some cases, the sensor inputs 118 may be automated in the sense that overt action by the user of the dialog assistant 110 may not be required in order for the sensor inputs 118 to be generated by the computing system 100 and made available to the dialog assistant 110. For instance, the sensor inputs 118 may include geographic location-related data that may be obtained by a location-based system, which may include a cellular or Global Positioning System (GPS) transceiver that is integrated with or in communication with the computing system 100. As another example, the sensor inputs 118 may include motion-related data obtained from an accelerometer or other type of motion sensor, which may be integrated with or in communication with the computing system 100. For instance, in some embodiments, the dialog assistant 110 may utilize computerized artificial intelligence-based models and/or techniques to determine a likely current context of the user based on the user's current or recent history of dialog with the computing device, the user's current or recent history of interactions with one or more end computer applications 144 or the computing device (e.g., the user's current or recent history of mouse clicks, items selected, or words typed), and/or current or recent sensor inputs 118. The dialog assistant 110 may use the current context to generate an appropriate clarification question or statement. Some examples of virtual personal assistants and "context-aware" systems that may be used in connection with the dialog assistant 110 are described in Yadgar et al., U.S. patent application Ser. No. 13/314,965, filed Dec. 18, 2011, entitled "Generic Virtual Personal Assistant," now U.S. Pat. No. 9,082,402; Nitz et al., U.S. patent application Ser. No. 13/585,003, filed Aug. 14, 2012, titled "Method, System, and Device for Inferring a Mobile User's Context and Proactively Providing Assistance;" U.S. patent Ser. No. 13/585,008, filed on Aug. 14, 2012, titled "Method, System, and Device for Inferring a mobile User's Context and Proactively Providing Assistance," now U.S. Pat. No. 9,015, 099; Wolverton et al., U.S. patent application Ser. No. 13/678,209, filed Nov. 15, 2012, titled "Vehicle Personal Assistant" and Wolverton et al., U.S. patent application Ser. No. 13/678,213, filed on Nov. 15, 2012, titled "Vehicle Personal Assistant," now U.S. Pat. No. 9,085,303. However, this disclosure is not limited thereby, and any suitable methods or systems for establishing a natural language dialog with a user and/or determining a user's current context may be used. Based on its analysis of the current input 112, alone or in combination with previous rounds of inputs 112 and/or other inputs 114, 116, 118, the dialog assistant 110 generates one or more targeted clarification questions using, for example, a clarification question template 136, 138.

In more detail, the illustrative dialog assistant 110 is embodied as a number of computerized modules and data structures, which include: a natural language processor 120, a clarification target identifier 122, an attribute detector 124, a user response analyzer 126, a clarification dialog manager 128, a clarification policy analyzer 130, a clarification question generator 132, a clarification policy knowledge base 134, and a system output generator 140. It should be appreciated that the illustrative embodiment of these modules and data structures is defined as such for discussion purposes, and are not intended to imply that any specific implementation details are required. For example, any of these modules and data structures may be combined or divided into submodules, subprocesses, or other units of computer code or data as may be required by a particular design or implementation of the dialog assistant 110.

The illustrative natural language processor 120 detects and receives human natural language dialog inputs 112 from time to time during the operation of the dialog assistant 110. The inputs 112 can include natural language in a dialog initiated by the user and/or the user's natural language responses to system-generated output 142. For example, the inputs 112 may include requests, statements made by the user to begin an information-seeking dialog, commands issued by the user to cause the system 100 to undertake some action, responses to system-executed actions, and/or responses to clarification questions presented by the system 100. The natural language processor 120 may convert the human natural language dialog inputs 112 into machine-readable versions 112A thereof. Depending on the particular implementation, the inputs 112 may be audio, text, some other natural language inputs, or a combination thereof. Accordingly, in some embodiments, the natural language processor 120 converts natural language audio into a text or otherwise machine-readable format that can form the basis of the analysis performed by the dialog assistant 110. Further, the natural language processor 120 may apply syntactic, grammatical, and/or semantic rules to the version 112A to parse and/or annotate the version 112A in order to better understand the user's intended meaning of the natural language inputs 112. In doing so, the natural language processor 120 may provide further analysis to, for example, distill the natural language inputs 112 to its significant words (e.g., removing grammatical articles or other superfluous language) and/or otherwise determine the true intent or meaning of those words. In some embodiments, the actual words of the input 112 are less important than the intent expressed using those words.

Some embodiments of the natural language processor 120 may include an automatic speech recognition (ASR) system and/or a natural language understanding (NLU) system. In general, an ASR system identifies spoken words and/or phrases in verbal natural language dialog inputs 112 and, in some embodiments, recognizes and converts them into text form (e.g., words, word strings, phrases, "segments," "chunks," "sentences," or other forms of verbal expression). There are many ASR systems commercially available; one example is the DYNASPEAK system, available from SRI International. In general, an NLU system parses and semantically analyzes and interprets the verbal content of the inputs 112 that have been processed by the ASR system. In other words, the NLU system analyzes the words and/or phrases produced by the ASR system and determines the meaning most likely intended by the speaker given, for example, the other words or phrases presented by the user or the dialog assistant 110 itself. For instance, the NLU system may determine, based on the verbal context, the intended meaning of words that have multiple possible definitions (e.g., the word "pop" could mean that something has broken, may refer to a carbonated beverage, or may be the nickname of a person, depending on the context, including the surrounding words and/or phrases of the input or previous rounds of dialog). An illustrative example of an NLU component that may be used in connection with dialog assistant 110 is the SRI Language Modeling Toolkit, available from SRI International.

Additionally (for example, within an ASR or NLU system), during processing of the inputs 112, the natural language processor 120 may assign attributes to one or more of the words or phrases in the recognized text or other machine-readable version 112A of the inputs 112. The attributes may include different sets of tags, labels, or attributes depending on the particular implementation of the system 100. Each recognized text word, phrase, and/or segment of the input 112 may be identified (e.g., tagged) as either erroneous or not erroneous, which signifies whether there is likely an error, ambiguity, or other lack of clarity as to each word, phrase, and/or segment of the analyzed input 112. To do this, some embodiments of the natural language processor 120 may use, for example, a set of statistical confidence measures and lexical and syntactic features. The natural language processor 120 may also tag holes (i.e., missing pieces) in the text version of the recognized speech. "Holes" may refer to, for example, one or more words that may not have been recognized, may have been recognized poorly, or may be missing but considered as being needed to accurately evaluate the intent or other characteristic of the user's input 112. In some embodiments, the natural language processor 120 assigns (e.g., as an attribute) a confidence level to each word and/or phrase of the natural language input 112 or machine-readable version 112A thereof. The confidence level is, in general, a probabilistic or statistical measure of whether the word or phrase in question includes an error, ambiguity, or otherwise requires clarification. Further, it should be appreciated that, in some embodiments, the natural language processor 120 and the clarification target identifier 122 may work in tandem to assign tags, labels, or attributes to the various words, phrases, and/or segments of the machine-readable version 112A of the input 112.

The illustrative clarification target identifier 122 includes an attribute detector module 124 and a user response analyzer module 126. The clarification target identifier 122 identifies one or more clarification targets within the version 112A of the human-generated conversational natural language input 112. The clarification target identifier 122, for example, may recognize a particular word as an unknown or out-of-vocabulary (OOV) word. Some sample OOV terms that may be identified by the clarification target identifier 122 include named entities (e.g., proper nouns), non-named entities (e.g., terms that are not proper nouns but also not recognized by the dialog assistant 110 based on, for example, a dictionary or terms list), unrecognized machine translations, and other OOVs. Other types of clarification targets include mispronunciations, homophones, ambiguities, idioms, and/or others.

The attribute detector 124 may identify (e.g., in conjunction with other portions of the clarification target identifier 122) the clarification targets based on the recognized words and the attributes, tag, or labels (referred to individually or collectively as "attributes" for convenience) assigned to each of those words, phrases, and/or segments. Based on the attributes detected by the attribute detector 124, the clarification target identifier 122 may make a determination regarding whether a particular word or phrase of a version 112A of the input 112 includes an error, for example, based on assigned attributes such as the confidence levels, prosodic features (i.e., the rhythm, stress, and intonation of speech), and/or syntactic features associated with each word and the surrounding words of the input 112. As discussed in greater detail below, the dialog assistant 110 may generate a clarification question based on the type of clarification target the dialog assistant 110 is attempting to resolve. Additional details regarding specific examples of the components of the dialog assistant 110, including the natural language processor 120 and the clarification target identifier 122, are described in Ayan et al., "Can You Give Me Another Word for Hyperbaric?": Improving Speech Translation Using Targeted Clarification Questions," Proceedings of ICASSP-2013, Vancouver, Canada, May 26-31, 2013, which is incorporated herein by this reference.

The user response analyzer 126 interacts with the attribute detector 124 to determine whether the user's natural language responses to clarification questions and/or other system outputs need clarification. For instance, the natural language processor 120 may receive and process a human-generated conversational natural language response to the clarification question as another round of input 112. The user response analyzer 126 may analyze the user's response to the clarification question and/or other system output 142, to clarify the user's intended meaning of the clarification target. To do so, the user response analyzer 126 may extract (e.g., by parsing) an answer relating to the clarification target from the user's response and modify the initial natural language dialog input 112 by replacing at least a portion of the clarification target with a machine-readable version of at least a portion of the answer. For example, the user response analyzer 126 may use a rule-based string alignment procedure to align the extracted answer of the user's response with the user's initial input 112. To do this, the user response analyzer 126 may detect important words, anchor points, and/or other linguistic characteristics in the input and/or the user's response. One example of a general purpose toolkit for performing string alignment is the openFst open source toolkit, which is publicly available under the Apache open source license. Other tools for performing string alignment may also be used, including parsers and statistical classifiers. For example, statistical classifiers may be employed to determine the words of the user's response that most likely correspond to the requested clarification. Additional details regarding some examples of answer extraction techniques can be found in the aforementioned Ayan et al., "Can You Give Me Another Word for Hyperbaric?": Improving Speech Translation Using Targeted Clarification Questions." Alternatively, the user response analyzer 126 may simply reformulate the original input 112 based on the user's answer, but without merging the user's response with the original input 112.

Further, the user response analyzer 126 may analyze the user's response and/or the clarified machine-readable input 112A, and determine (e.g., with the clarification target identifier 122) whether to generate another clarification question. For example, the clarification question generator 132 may need to generate another clarification question if the user's response did not satisfactorily clarify the clarification target and/or other clarification targets remaining (e.g., those not addressed by the clarification question) that require clarification. If the user's response did not satisfactorily clarify the clarification target, the clarification question generator 132 may select and/or generate and present another clarification question. In some embodiments, the dialog assistant 110 clarifies the input 112 before the input 112A (or modified/clarified input 112B) is further processed by the computing system 100 (e.g., by a computer application 144 or the dialog assistant 110).

Among other things, the illustrative clarification dialog manager 128 determines a clarification type that relates to a clarification target. In general, the clarification type indicates a type of clarification, correction, or change that is needed to clarify the user's intended meaning of the clarification target. In some embodiments, the clarification dialog manager 128 keeps track of the current state and flow of each conversation or dialog that occurs between the user and the dialog assistant 110. The clarification dialog manager 128 may apply dialog-managing rules, templates, or task flows, for example, to the inputs 112. For example, the clarification dialog manager 128 may include rules (e.g., domain-specific rules) for determining when a conversation has started or ended, or for determining whether a natural language dialog input 112 is related to other inputs 112. Such other inputs may include inputs 112 that have been received in one or more prior rounds of the same dialog and/or inputs 112 that have been received around the same time as the current input 112, and may also include one or more non-dialog inputs such as inputs 114, 116, and/or 118.

As an example, a rule for determining whether a conversation has ended may allow for longer pauses between portions of a user's natural language dialog input 112, based on the likelihood that the user's attention to the dialog may be interrupted by the need to focus on other aspects of the user's current context. For instance, if the sensor inputs 118 indicate that the user is currently driving a car or at a shopping mall, the dialog manager may allow for shorter or longer pauses than if the sensor inputs 118 indicate that the user is at home or in the office at work. Further, in some embodiments, the clarification dialog manager 128 may record data relating to the various rounds of dialog that may occur over time. For example, clarifications previously made by the dialog assistant 110 and associated context information may be stored in the clarification policy knowledge base 134. As another example, over time, the clarification dialog manager 128 may learn (using, e.g., machine learning techniques) that certain clarification questions (e.g., clarification templates 136, 138) or user-supplied clarifications of the inputs 112 are associated with certain dialog contexts based on, for example, recurring patterns of natural language dialog between the user and the computing device.

As shown in the illustrative embodiment of FIG. 1, the clarification dialog manager 128 includes a clarification policy analyzer 130 and a clarification question generator 132. The clarification policy analyzer 130 uses the clarification policy knowledge base 134 to analyze the clarification target and/or user responses to clarification questions. That is, generally speaking, rule-based clarification question templates 136 and statistical model-based clarification question templates 138 are based on rules and statistical models, respectively, that, in combination with the resulting templates, define a clarification policy that can instruct the clarification dialog manager 128 as to whether, when, and how to select and generate a clarification question. In other words, rules and/or statistical models specify the conditions that are used to determine how to produce the clarification question templates 136, 138, while the templates 136, 138 specify the form and/or substance of the system output that is presented to the user as a clarification question. The clarification question templates 136, 138 can change and evolve over time, because different conditions may be satisfied by different inputs 112, and the user's responses to the system's clarification questions can be used to inform or modify the conditions in response to which different templates may be used (using, for example, machine learning techniques). As an example, clarification questions may be stated by the system 100 in different ways, depending on the system's analysis of the user's inputs 112 (including the user's responses to clarification questions) over time and/or other factors.

The clarification question generator 132 may generate a conversational natural language clarification question based on the clarification type associated with a clarification target and/or, as noted above, based on the user's current context. That is, the clarification question generator 132 or the clarification dialog manager 128 generally may determine which clarification target to address, and generate a clarification question directed to that clarification target. If multiple clarification targets have been identified by the clarification target identifier 122, the clarification question generator 132 determines a hierarchy or ordering of the multiple clarification targets, which may be used to guide the clarification process (e.g., an order in which to address the clarification targets). For example, the clarification question generator 132 may apply automated reasoning techniques and/or other analyses to determine which clarification target appears to be the most important to resolve in order to decipher the overall intent of the user's input 112. In another example, the clarification question generator 132 may determine a clarification target in which the clarification question generator 132 is most confident about the appropriate clarification type (where the level of confidence is determined with reference to a probabilistic or statistical model, for example), and generate a clarification question for that target first. Additionally, the clarification question generator 132 may generate a clarification question that addresses more than one clarification target at the same time (e.g., concurrently or simultaneously), in some instances.

The clarification question generator 132 may refer to various clarification question templates 136, 138 to generate the clarification questions, as discussed above. In some embodiments, the clarification question templates 136, 138 correspond to (e.g., are mapped to, by a table or other data structure, for example) the type of clarification target. For instance, the clarification templates 136, 138 may comprise one or more static portions (e.g., some appropriate words or phraseology based on the clarification type, such as "I think I heard . . . " or "Did you mean . . . ") and one or more variable portions (e.g., a parameter that is replaced by a portion of the input 112 when the clarification question is output by the system 100). As an example, the clarification question templates 136, 138 may include one or more of the following: a first template that asks for the spelling of a word (e.g., for named-entity OOVs), a second template that asks for another word or phrase (e.g., for non-named entity OOVs and machine translation OOVs), a third template which provides alternatives and asks for disambiguation (e.g., for homophones and word sense confusion), a fourth template which substitutes erroneous words and/or phrases with an interrogative pronoun (e.g., "what," "who," "where," "which," or "what kind of") depending on the assigned attributes or tags (e.g., for mispronunciations and non-OOV errors), and a fifth template which confirms a name, a spelling, or an entire utterance. The clarification question templates 136, 138 may be domain-specific (e.g., medical, legal, car mechanics, etc.) in some embodiments. That is, the templates 136, 138 may include domain-specific phraseology and/or parameters (e.g., specific vocabularies or language models for military, healthcare, legal, or other domains). Some example usages of clarification templates are shown below in Table 1.

As noted above, the illustrative dialog assistant 110 includes a clarification policy knowledge base 134, which includes the clarification templates 136, 138. Additionally, in some embodiments, the dialog assistant 110 may maintain (e.g., in a buffer or other form of computer memory) a history of previous clarifications made during the current user-system dialog and/or previous dialog sessions. In some embodiments, the clarification question generator 132 may generate a clarification question based on the prior clarification history and without using the clarification question templates 136, 138. Thus, in some embodiments, the clarification question generator 132 may utilize the stored information relating to the user's history of prior clarifications, the elements 136, 138 of the clarification policy knowledge base 134, and/or other methods or techniques, or a combination of any of these, in order to determine an appropriate system response to the clarification target, whether it be to present a clarification question or simply to generate a clarified version of the user's input 112. In some embodiments, the clarification question templates 136, 138 may include multiple templates for each type of clarification target, so that an appropriate template can be selected based on the user's current context, or so that the clarification question generator 132 can avoid repeating the same clarification question to the user, thereby allowing the dialog between the user and the computing system 100 to assume a more natural dialog flow. As noted above, the clarification question generator 132 may use the current context of the user (as determined by the computing system 100, e.g., from the sensor inputs 118 and/or previous dialog) to generate a clarification question. For example, the clarifications history may include data regarding previous clarifications (i.e., responses to clarification questions). As such, the clarification question generator 132 may retrieve from memory information regarding previous clarifications and/or other dialog with the user in order to generate the clarification question or to simply go ahead and make a clarification to the input 112, autonomously. Additionally, in some embodiments, the dialog assistant 110 may utilize automated artificial intelligence techniques and/or other methods to make an educated guess regarding the intent of the human natural language dialog input 112, without asking a clarification question, and then present the suggested clarification to the user for feedback.

The illustrative system output generator 140 generates a conversational natural language clarification question, e.g., based on the selected clarification question template and/or the clarification type that is associated with the clarification target, alone or in combination with other system output, in response to the clarification target. That is, the system output generator 140 may generate a natural-language version of the computer-based representation of the clarification question for presentation to the user, alone or in combination with other output, including graphical output such as digital images or video. For example, a speech synthesizer may be used to convert natural-language text generated by the clarification question generator 132 and/or the output generator 140 (or even the unprocessed output) to speech (e.g., machine-produced speech using a human voice). Alternatively or additionally, the system output may be visually presented (e.g., as text, graphics, or video) on a display screen of the computing system 100 or another display screen (e.g., a dash-mounted display screen inside a vehicle if the dialog assistant 110 is used in a vehicle-related virtual personal assistant context). The natural-language and/or other forms of output may be transmitted or otherwise made available as a system output 142 to, for example, one or more other computer applications 144, which may include other hardware, firmware, or software modules that are integrated with or external to the dialog assistant 110 or the computing system 100, more generally. For example, the output generator 140 may generate a natural language version of the computer-based representation of the clarification question, which may be transmitted as system output 142 for another system module to process and/or output to the user. In some embodiments, the output generator 140 may output a machine-readable version or semantic interpretation of the clarification question to a computer application 144, which may then prepare a natural language version (or other suitable form) of the clarification question for presentation to the user.

In general, the bidirectional arrows connecting the clarification policy knowledge base 134 to the clarification dialog manager 128 is intended to indicate dynamic relationships therebetween. For example, the clarification policy knowledge base 134 may be updated (e.g., stored in storage media of the computing system 100) based on one or more rounds of dialog and clarification obtained by the dialog assistant 110. Further, as discussed above, data may be retrieved from the clarification policy knowledge base 134 by the clarification dialog manager 128. Similarly, other bidirectional arrows in FIG. 1 indicate that two-way communication between the connected modules or elements can occur, in some embodiments.

Figure 2:
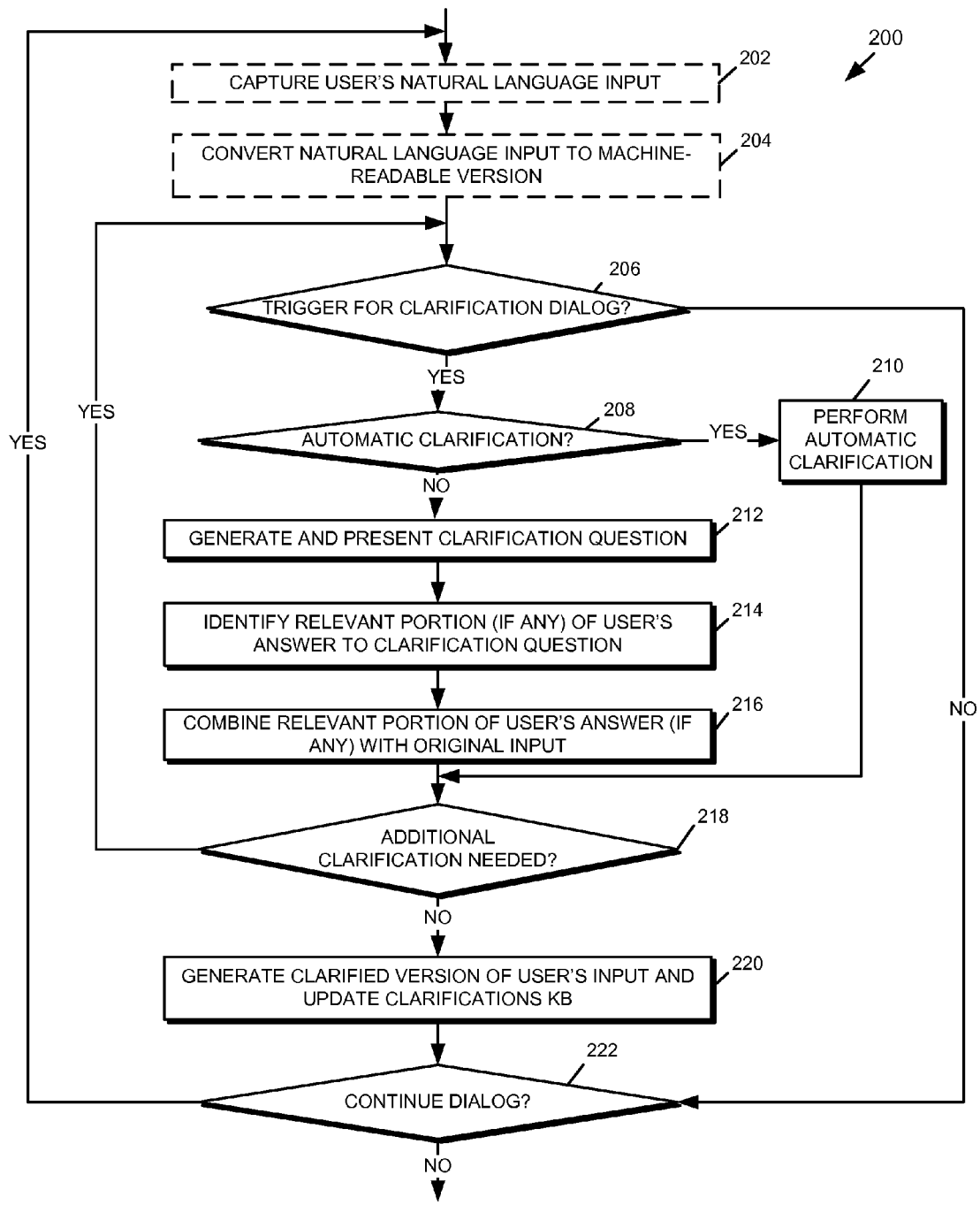
FIG. 2 is a simplified flow diagram of at least one embodiment of a method by which the dialog assistant of FIG. 1 may analyze the human-generated conversational natural language input.

Referring now to FIG. 2, an illustrative method 200 for analyzing the human-generated conversational natural language input. The method 200 or portions thereof may be embodied as computerized programs, routines, logic and/or instructions of the computing system 100, e.g., as part of the dialog assistant 110. At block 202, the method 200 may capture the user's spoken natural language input 112. For example, all or portions of the user's spoken natural language input 112 may be captured with a microphone or other audio input device of the computing system 100, and stored in memory of the computing system 100. In the case of text-based natural language input 112, the input 112 may be captured by, for example, a touch pad, key pad, or touch screen of the computing system 100. In some cases, gesture inputs may be captured by, e.g., a camera, which may be integrated with or otherwise in communication with the computing system 100. In any event, the captured inputs 112, 114, 116, 118 are at least temporarily stored in memory of the computing system 100. At block 204, the method 200 may convert the user's natural language input 112 to a machine-readable version 112A of the input 112. For example, as discussed above, the input 112 may be converted to machine-readable text.

At block 206, the method 200 determines whether an event has occurred that should trigger a clarification dialog. For instance, the method 200 determines whether any clarification targets are identified in the machine-readable version 112A of the input 112 using, e.g., one or more of the techniques described above. Other possible triggering events include the receiving, by the dialog assistant 110, of data and/or instructions from an "end" computer application 144. As an example, an external machine translation system or VPA might detect an error in natural language dialog input that it has received and then communicate that input, along with a tag or annotation identifying the error or location thereof, to the dialog assistant 110. Another illustrative triggering event is a period of silence or inactivity by the user after a dialog with the computing device has started. For example, if a VPA application has been conducting a dialog with user and the user does not respond within a period of time (e.g., a number of seconds) to a system-generated dialog, the dialog assistant 110 may be triggered to clarify the user's most recent previous dialog input to the VPA or to clarify the user's intentions as to the period of inactivity or silence.

If the method 200 determines that there are no clarification targets in the machine-readable version 112A, the method 200 proceeds to block 222, at which the method 200 determines whether to continue the natural language dialog with the user or proceed with some other activity (such as information retrieval or language translation). If the method 200 determines that one or more clarification targets are identified, the method 200 proceeds to block 208, at which the method 200 determines whether to perform autonomous (e.g., automatic, or without requesting user input) clarification of the input 112, or to generate a clarification question. If the method 200 determines that autonomous clarification is appropriate, the method performs autonomous clarification (e.g., by simply preparing a clarified version 112B of the user's input, as discussed above), at block 210, and then proceeds to block 218. If the method 200 determines that a clarification question is appropriate, the method 200 proceeds to block 212 and generates and presents a clarification question. Illustrative processes of block 212 are described in detail below with reference to FIG. 3.

At block 214, the method 200 receives the user's answer to the clarification question (e.g., via a microphone or other input-output device of the system 100). As discussed above, the user responds to the clarification question and the method 200 extracts an answer from the user's response, where the answer includes at least a portion of the user's response that is relevant or pertinent to the clarification question, if any. The extracting may involve, for example, the filtering out of non-specific or superfluous words or phrases, such as "um," "hmm," "well," etc. If no portion of the user's answer appears to the method 200 to be responsive to the clarification question, the method may ask a follow-up clarification question, which may be more generalized or may refer to a portion of the user's initial response. At block 216, the method 200 combines the user's answer (e.g., the portions thereof that are relevant for purposes of clarifying the original input 112) with the original input 112 (or the machine-readable versions 112A thereof). In doing so, the method 200 may use, for example, an alignment procedure or algorithm as discussed above. A number of techniques can be used to identify the relevant portion or portions of the user's response and combine those portions with the original input 112 (or 112A) (which may be referred to herein simply as "112," for convenience), including a method similar to those described above for identifying clarification targets. In some embodiments, only those relevant portions of the user's response (and not the whole response) are combined or "merged" with the original input 112.

At block 218, the method 200 determines whether additional clarification of the original input 112, or partially clarified version thereof, is needed. To do so, the method 200 may determine whether the user's answer satisfactorily clarifies the clarification target. As discussed above, the user's response and, therefore, the user's answer to the clarification target may not adequately address the error or ambiguity associated with the clarification target. Accordingly, the method 200 may need to generate and present a different clarification question to the user. Additionally, other clarification targets may exist that need to be clarified by the user. As such, if additional clarification is needed, the method 200 returns to block 206, at which the method 200 again determines if any unresolved clarification targets are identified in the machine-readable version of the input 112, and proceeds accordingly.

If, however, the method 200 determines that no additional clarification is needed, the method proceeds to block 220, at which the method 200 generates a clarified version 112B of the user's input 112 and updates the clarification policy knowledge base 134. As discussed above, in some embodiments, generating the clarified user's input 112B includes merging the user's answers with the input 112/112A or subsequently clarified inputs. After generation, the clarified user's input 112B may be passed as system output 142 to other components of the computing system 100. For example, the system output 142 may be used to consult an appropriate knowledge base in order to retrieve information to respond to the user's original input 112 based on the user's intended goal or objective of the dialog, as clarified by the dialog assistant 110. In some embodiments, the system output 142 includes or embodies the user's intent based on the original input 112, the user's response(s) to clarification questions (which may also be considered inputs 112), one or more of the other forms of inputs 114, 116, 118 (e.g., a "merged" intent, as discussed above), the clarified version 112B of the original input 112, or a combination of any of these. The system output 142 may take any suitable form, such as a semantic or natural language representation of the determined user intent, arguments, or parameters.

At block 222, the method 200 determines whether to continue the dialog with the user. In some embodiments, the method 200 may determine whether to continue the dialog by determining whether the conversation between the computing device and the user has ended or whether the user's input 112 is related to one or more previous inputs 112. The method 200 may apply various rules to determine whether the user inputs 112 that have been received in one or more prior rounds of the same dialog and/or inputs 112 that have been received around the same time as the current input 112 are related to the current input 112 and/or suggest that the method 200 should continue the same dialog. Of course, the method 200 may apply different rules to determine whether to continue the dialog. If the dialog is continued, the method 200 returns to block 202, at which the method 200 may capture the user's additional natural language input 112.

Figure 3:
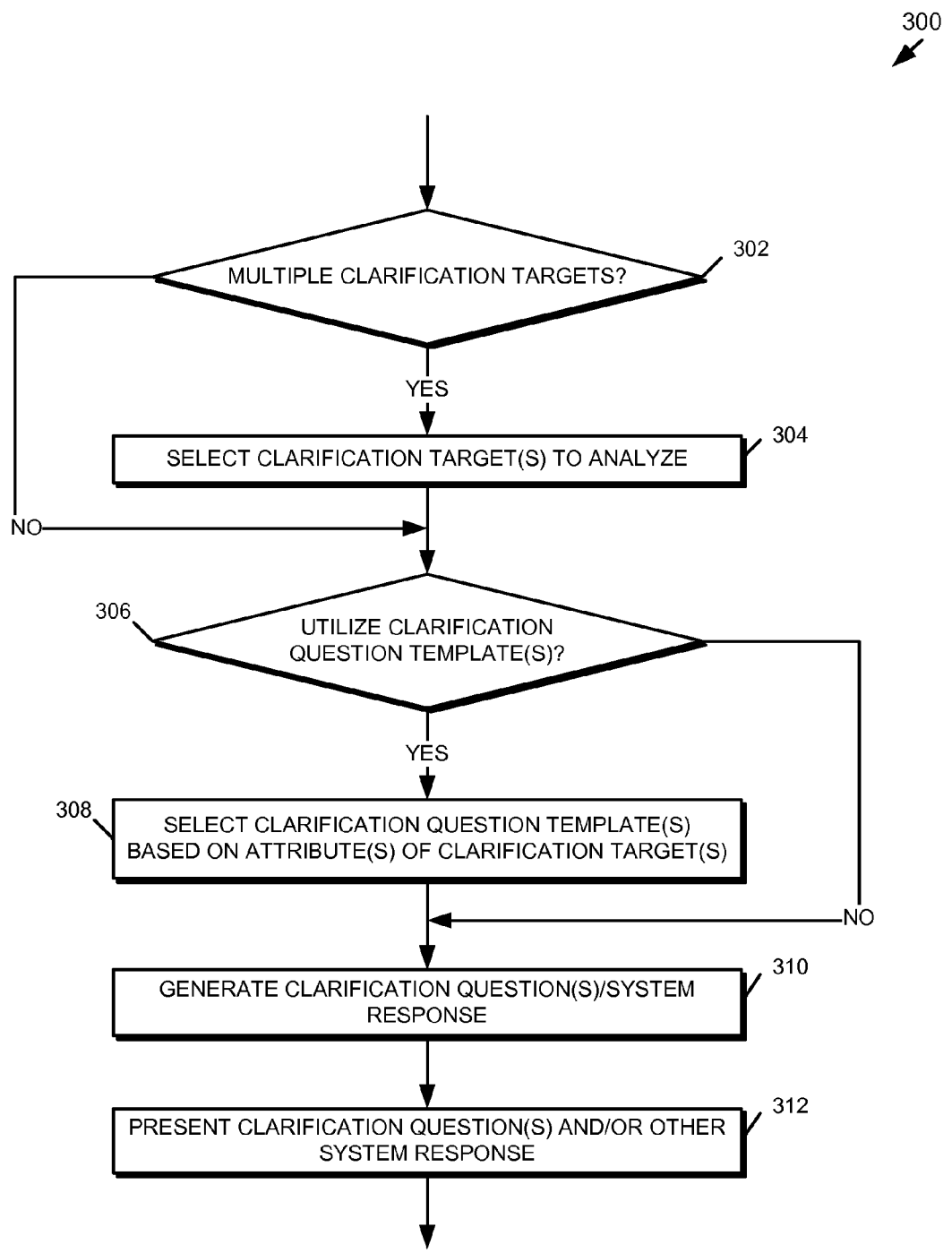
FIG. 3 is a simplified flow diagram of at least one embodiment of a method by which the dialog assistant of FIG. 1 may generate and present a clarification question.

Referring now to FIG. 3, an illustrative method 300, all or portions of which are executable as computerized programs, routines, logic and/or instructions by one or more of the various modules of the computing system 100 to generate and present a clarification question, is shown. At block 302, the method 300 determines whether there are multiple clarification targets. If it is determined that there are not multiple clarification targets, the method 300 advances to block 306, at which the method 300 determines whether to utilize a clarification question template 136, 138.

However, if the method 300 determines that there are multiple clarification targets, the method 300 selects one or more clarification targets to analyze at block 304. As discussed above, the method 300 may establish a hierarchy defining an order in which to address the clarification targets. For example, the method 300 may prioritize the analysis of the clarification targets from most critical to least critical in assessing the intent of the user input 112. In another embodiment, the method 300 may select the easiest target to analyze or the target in which the method 300 is most confident that it will be able to resolve. Further, as discussed above, in some cases, the method 300 may select and analyze multiple clarification targets (e.g., similar clarification targets) simultaneously.

At block 306, the method 300 determines whether to utilize a clarification question template 136, 138 to generate a clarification question for the user to address the selected clarification target. If the method 300 determines that a clarification question can be generated without using a clarification template, the method 300 proceeds to block 310 at which the method 300 generates a clarification question using other methods. If a clarification question template 136, 138 is used, the method 300 selects one or more clarification question templates 136, 138 based on, for example, the attributes of the clarification target. For example, as discussed above, one clarification question template 136, 138 may be used for one type of clarification target (e.g., a homophone), whereas another clarification question template 136, 138 may be used for a different type of clarification target (e.g., an idiom).

At block 310, the method 300 generates a clarification question directed to the selected clarification target. It should be appreciated that the method 300 may generate multiple clarification questions and/or address multiple clarification targets concurrently. At block 312, the method 300 presents the generated clarification question(s) and/or other system output 142 to the user. For example, the method 300 may convert a natural-language text version of the clarification question to speech (e.g., machine-produced speech using a human voice) for presentation to the user (e.g., via speakers of the system 100). Alternatively or additionally, the method 300 may visually present the clarification question to the user on a display screen of the computing system 100. Further, in some embodiments, the method 300 may present a graphic, image or video on the display screen of the computing device, in conjunction with the clarification question, to assist the user in responding to the clarification question.

Example Usage Scenarios

Figure 4:
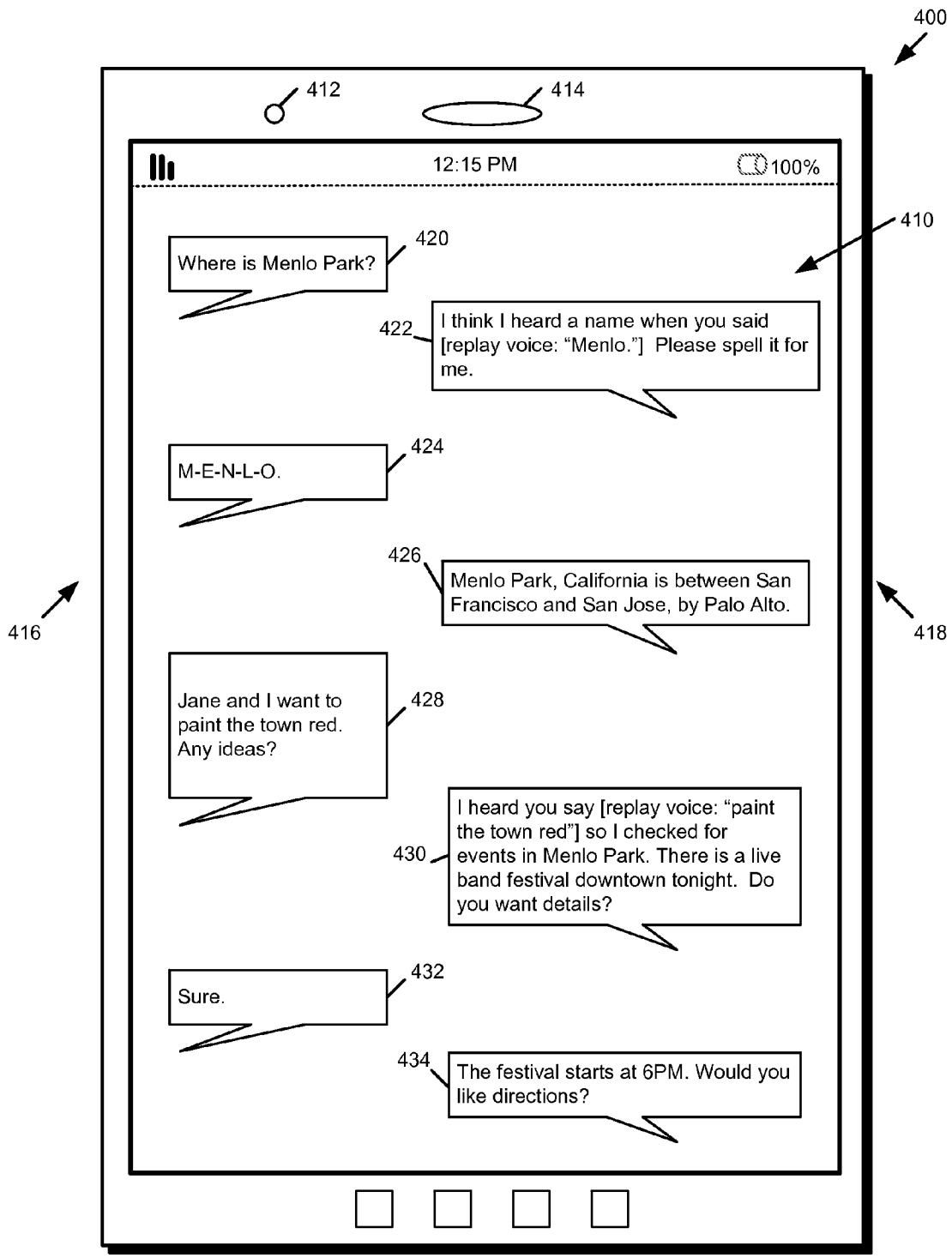
FIG. 4 illustrates an example of a user interaction with a computing device that may occur in connection with the use of at least one embodiment of the dialog assistant of FIG. 1.

The dialog assistant 110 has a number of different applications. Referring now to FIG. 4, an example of an human-machine interaction that may be enhanced or at least informed by the dialog assistant 110 is shown. The interaction involves a user and a computing system 400. Illustratively, the computing system 400 is embodied as a mobile electronic device such as a smart phone, tablet computer, or laptop computing device, in which a number of sensing devices 412, 414 are integrated (e.g., two-way camera, microphone, etc.). The interaction is illustrated as occurring on a display screen 410 of the system 100, however, all or portions of the interaction may be accomplished using audio, e.g., a spoken natural-language interface, rather than a visual display. The illustrated interaction may be performed by a dialog assistant component of the system 400 or other dialog-based software applications or user interfaces. The interaction involves user-supplied natural-language dialog 416 and system-generated dialog 418. In the illustrated example, the user initiates the interaction at box 420, although this need not be the case. For example, the interaction may be a continuation of an earlier-started dialog, or the computing system 400 may autonomously initiate the clarification dialog (e.g., in response to one or more inputs 114, 116, 118).

At box 420, the user issues a natural language statement (e.g., speech or other natural language input). Using the dialog assistant 110, the system 400 interprets the user's statement and identifies "Menlo" as a clarification target (e.g., an OOV proper noun). Accordingly, the dialog assistant 110 generates an appropriate clarification question (e.g., using a clarification question template 136, 138 configured for the clarification of proper nouns), which is presented to the user at box 422. As shown, the system 400 requests the user to spell the proper noun and includes in the clarification question the user's recorded audio speech of the word "Menlo." At box 424, the user responds with the appropriate spelling of the word, "Menlo." After receiving the user's response, the dialog assistant 110 extracts the answer to the clarification question and merges the answer with the user's initial input from box 420. For example, the initial input may have been interpreted by the dialog assistant 110 as "Where is <clarification target: proper noun>park." After merging, the user input may be understood as "Where is Menlo Park?" Accordingly, the system 400 provides an answer at box 426.

At box 428, the user offers (e.g., by text or voice) that "Jane and I want to paint the town red" and asks the system 400 if it has "any ideas." The dialog assistant 110 identifies "paint the town red" as a clarification target but based on having previously learned a clarification for this idiom ("paint the town red"), the system 400 understands the input to mean that the user is interested in entertainment options. Additionally, the system 400 recognizes that the user wants to know about entertainment options in Menlo Park from the context of the conversation. As such, at box 430, the system 400 repeats the stated idiom for clarification, identifies an event in Menlo Park that the user may be interested in, and asks if the user wants details about the event. Following that, the user and the system 400 continue the dialog at boxes 432, 434 regarding the identified event. At box 434, the system 400 detects that there are no clarification targets in the input of box 432, and thus simply continues the dialog without issuing any clarification questions.

As discussed above, a wide array of clarification questions and clarification question templates 136, 138 may be used to solicit clarifications from the user regarding clarification targets. Several example clarification questions and the corresponding user statements triggering those questions are shown in Table 1 below.

TABLE 1

User Statements and Corresponding Clarification Questions

User: Hello, my name is Captain Hill.
Clarification Type: Named entity OOV
System: I think I heard a name when you said [play-user-speech: Hill]. Could you please spell that name?

TABLE 1-continued

User Statements and Corresponding Clarification Questions

User: We recently got a large philanthropic donation.
Clarification Type: Non-named entity OOV
System: Can you please tell me another word or phrase for this: [play-user-speech: philanthropic].
User: We need some patients to use this medication.
Clarification Type: Homophone
System: Did you mean patience as in "tolerance of delay" or patients as in "people who require medical care?" Please say one or two.
User: We need to collect some demographees about your family.
Clarification Type: Mispronunciation
System: Collect some what?
User: We should not have any unforeseen difficulties.
Clarification Type: MT OOV
System: I do not know how to translate the word "unforeseen." Can you give me another word for it?

It should also be appreciated that the dialog assistant 110 may be used in a variety of different implementations. For example, as noted above, the dialog assistant 110 may be embodied as a component of a virtual personal assistant software application. In some embodiments, the virtual personal assistant may include an ASR, NLU, and/or domain-specific knowledge bases to facilitate the user's interaction with the virtual personal assistant. Further, in some embodiments, the dialog assistant 110 may be used to facilitate a natural language-based web search. Additionally, in other embodiments, the dialog assistant 110 may be part of a language translation system. For example, the dialog assistant 110 may be used in a system in which translation between languages (e.g., English to Mandarin Chinese) is required.

IMPLEMENTATION EXAMPLES

Figure 5:
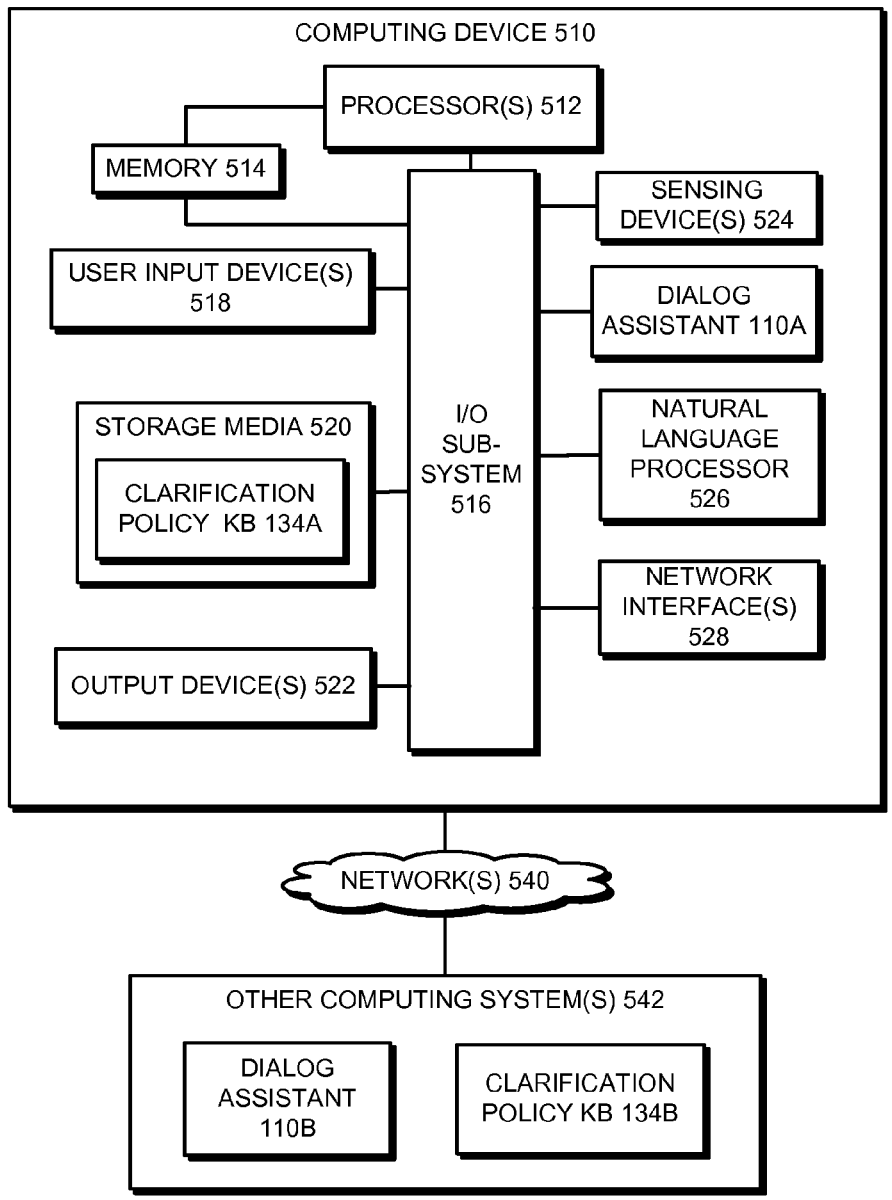
FIG. 5 is a simplified block diagram of an exemplary computing environment in connection with which at least one embodiment of the dialog assistant of FIG. 1 may be implemented.

Referring now to FIG. 5, a simplified block diagram of an exemplary hardware environment 500 for the computing system 100, in which the dialog assistant 110 may be implemented, is shown. The illustrative implementation 500 includes a computing device 510, which may be in communication with one or more other computing systems or devices 542 via one or more networks 540. Illustratively, a portion 110A of the dialog assistant 110 is local to the computing device 510, while another portion 110B is distributed across one or more of the other computing systems or devices 542 that are connected to the network(s) 540. For example, in some embodiments, portions of the clarification policy knowledge base 134A may be stored locally while other portions 134B are distributed across a network (and likewise for other components of the dialog assistant 110). In some embodiments, however, the dialog assistant 110 may be located entirely on the computing device 510. In some embodiments, portions of the dialog assistant 110 may be incorporated into other systems or interactive software applications. Such applications or systems may include, for example, operating systems, middleware or framework (e.g., application programming interface or API) software, and/or user-level applications software (e.g., a virtual personal assistant, another interactive software application or a user interface for a computing device).

The illustrative computing device 510 includes at least one processor 512 (e.g. a microprocessor, microcontroller, digital signal processor, etc.), memory 514, and an input/output (I/O) subsystem 516. The computing device 510 may be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 516 typically includes, among other things, an I/O controller, a memory controller, and one or more I/O ports. The processor 512 and the I/O subsystem 516 are communicatively coupled to the memory 514. The memory 514 may be embodied as any type of suitable computer memory device (e.g., volatile memory such as various forms of random access memory).

The I/O subsystem 516 is communicatively coupled to a number of components including one or more user input devices 518 (e.g., a touchscreen, keyboard, virtual keypad, microphone, etc.), one or more storage media 520, one or more output devices 522 (e.g., speakers, LEDs, etc.), the one or more sensing devices 524 described above, the natural language processor 526 (e.g., in embodiments where all or portions of the natural language processor 120 are implemented or accessed as separate modules or systems, apart from the dialog assistant 110), and one or more network interfaces 528. The storage media 520 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), and/or the portion 110A of the dialog assistant 110 reside at least temporarily in the storage media 520. Portions of systems software, framework/middleware, and/or the portion 110A may be copied to the memory 514 during operation of the computing device 510, for faster processing or other reasons. In other embodiments, the portion 110A may alternatively be embodied as hardware.

The one or more network interfaces 528 may communicatively couple the computing device 510 to a local area network, wide area network, personal cloud, enterprise cloud, public cloud, and/or the Internet, for example. Accordingly, the network interfaces 528 may include one or more wired or wireless network interface cards or adapters, for example, as may be needed pursuant to the specifications and/or design of the particular computing system 100. The other computing system(s) 542 may be embodied as any suitable type of computing system or device such as any of the aforementioned types of devices or other electronic devices or systems. For example, in some embodiments, the other computing systems or devices 542 may include one or more server computers used to store portions of the clarification policy knowledge base 134B and/or the portion 110B of the dialog assistant 110. The computing system 100 may include other components, sub-components, and devices not illustrated in FIG. 5 for clarity of the description. In general, the components of the computing system 100 are communicatively coupled as shown in FIG. 5 by electronic signal paths, which may be embodied as any type of wired or wireless signal paths capable of facilitating communication between the respective devices and components.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A computer-implemented method, comprising:
receiving, by a computing device, input, wherein the input is associated with an interaction with the computing device, and wherein the input includes dialog input, application input, or sensor input;
determining an interaction history, wherein determining includes adding the input to the interaction history, wherein adding includes using an artificial intelligence-based model to combine the input with prior interaction history;
determining a current context, wherein the current context is associated with an interaction with the computing device, and wherein the interaction includes dialog input, application input, or sensor input;
receiving verbal input, wherein the verbal input includes natural language, and wherein the verbal input includes a plurality of words;
interpreting the verbal input, wherein interpreting the verbal input includes assigning one or more attributes to the plurality of words;

identifying an attribute from the one or more attributes, wherein the identified attribute is associated with one or more words from the plurality of words, wherein the identified attribute indicates that the one or more words are unclear, and wherein a word is unclear when the computing system cannot recognize the word;

determining that the current context and the interaction history do not clarify the one or more words;

determining a type of information needed to recognize the one or more words, wherein determining includes using the one or more attributes assigned to the one or more words to identify missing information;

determining a clarification question for the one or more words, wherein determining includes using the type of information, the current context, and the interaction history, wherein the clarification question is formatted to request the missing information, and wherein the format is customized using the current context and the interaction history; and outputting the clarification question.

2. The computer-implemented method of claim 1, wherein application input includes data or instructions output by an application executing on the computing device.

3. The computer-implemented method of claim 1, wherein the sensor input is generated automatically.

4. The computer-implemented method of claim 1, further comprising:

receiving non-verbal input, wherein the non-verbal input includes a physical motion interpreted from a sensor associated with the computing device, and wherein the current context includes the non-verbal input.

5. The computer-implemented method of claim 1, further comprising:

receiving additional verbal input;

determining that the additional verbal input includes the missing information.

6. The computer-implemented method of claim 1, further comprising:

receiving additional verbal input;

filtering one or more non-responsive portions of the additional verbal input; and extracting the missing information from the filtered additional verbal input.

7. The computer-implemented method of claim 1, further comprising receiving additional verbal input;

filtering one or more non-responsive portions of the additional verbal input; and determining that no part of the filtered additional verbal input includes the missing information.

8. The computer-implemented method of claim 7, further comprising:

determining a second clarification question, wherein the second clarification question is different from the clarification question for the one or more words; and outputting the second clarification question.

9. The computer-implemented method of claim 1, further comprising:

receiving additional verbal input;

using the additional verbal input, the current context, and the interaction history to determine an action; and executing the action, wherein the action modifies an operation of the computing device.

10. The computer-implemented method of claim 9, wherein using the additional verbal input includes modifying the verbal input to include the additional verbal input.

11. The computer-implemented method of claim 9, wherein using the additional verbal input includes generating new verbal input, wherein the new verbal input combines the verbal input and the additional verbal input.

12. The computer-implemented method of claim 1, wherein the interaction history includes a clarification history, wherein the clarification history includes one or more previous clarification questions, and wherein determining the clarification question further includes using the clarification history.

13. The computer-implemented method of claim 1, further comprising:

determining one or more additional attributes from the one or more attributes, wherein the one or more attributes indicate that one or more sets of words from the plurality of words are unclear; and determining an order for the identified attribute and the one or more additional attributes, wherein the order determines an order in which to clarify the identified attribute and the one or more attributes.

14. A computing device, comprising:

one or more processors; and a non-transitory computer-readable medium including instructions that, when executed by the one or more processors, cause the one or more processors to perform operations including:

receiving input, wherein the input is associated with an interaction with the computing device, and wherein the input includes dialog input, application input, or sensor input;

determining an interaction history, wherein determining includes adding the input to the interaction history, wherein adding includes using an artificial intelligence-based model to combine the input with prior interaction history;

determining a current context, wherein the current context is associated with an interaction with the computing device, and wherein the interaction includes dialog input, application input, or sensor input;

receiving verbal input, wherein the verbal input includes natural language, and wherein the verbal input includes a plurality of words;

interpreting the verbal input, wherein interpreting the verbal input includes assigning one or more attributes to the plurality of words;

identifying an attribute from the one or more attributes, wherein the identified attribute is associated with one or more words from the plurality of words, wherein the identified attribute indicates that the one or more words are unclear, and wherein a word is unclear when the computing system cannot recognize the word;

determining that the current context and the interaction history do not clarify the one or more words;

determining a type of information needed to recognize the one or more words, wherein determining includes using the one or more attributes assigned to the one or more words to identify missing information;

determining a clarification question for the one or more words, wherein determining includes using the type of information, the current context, and the interaction history, wherein the clarification question is formatted to request the missing information, and wherein the format is customized using the current context and the interaction history; and outputting the clarification question.

15. The computing device of claim 14, wherein application input includes data or instructions output by an application executing on the computing device.

16. The computing device of claim 14, wherein the sensor input is generated automatically.

17. The computing device of claim 14, wherein the non-transitory computer-readable medium further includes instructions that, when executed by the one or more processors, cause the one or more processors to perform operations including:
receiving non-verbal input, wherein the non-verbal input includes a physical motion interpreted from a sensor associated with the computing device, and wherein the current context includes the non-verbal input.

18. The computing device of claim 14, wherein the non-transitory computer-readable medium further includes instructions that, when executed by the one or more processors, cause the one or more processors to perform operations including:
receiving additional verbal input;
determining that the additional verbal input includes the missing information.

19. The computing device of claim 14, wherein the non-transitory computer-readable medium further includes instructions that, when executed by the one or more processors, cause the one or more processors to perform operations including:
receiving additional verbal input;
filtering one or more non-responsive portions of the additional verbal input; and
extracting the missing information from the filtered additional verbal input.

20. The computing device of claim 14, wherein the non-transitory computer-readable medium further includes instructions that, when executed by the one or more processors, cause the one or more processors to perform operations including:
receiving additional verbal input;
filtering one or more non-responsive portions of the additional verbal input; and
determining that no part of the filtered additional verbal input includes the missing information.

21. The computing device of claim 20, wherein the non-transitory computer-readable medium further includes instructions that, when executed by the one or more processors, cause the one or more processors to perform operations including:
determining a second clarification question, wherein the second clarification question is different from the clarification question for the one or more words; and
outputting the second clarification question.

22. The computing device of claim 14, wherein the non-transitory computer-readable medium further includes instructions that, when executed by the one or more processors, cause the one or more processors to perform operations including:
receiving additional verbal input;
using the additional verbal input, the current context, and the interaction history to determine an action; and
executing the action, wherein the action modifies an operation of the computing device.

23. The computing device of claim 22, wherein using the additional verbal input includes modifying the verbal input to include the additional verbal input.

24. The computing device of claim 22, wherein using the additional verbal input includes generating new verbal input, wherein the new verbal input combines the verbal input and the additional verbal input.

25. The computing device of claim 14, wherein the interaction history includes a clarification history, wherein the clarification history includes one or more previous clarification questions, and wherein determining the clarification question further includes using the clarification history.

26. The computing device of claim 14, wherein the non-transitory computer-readable medium further includes instructions that, when executed by the one or more processors, cause the one or more processors to perform operations including:
determining one or more additional attributes from the one or more attributes, wherein the one or more attributes indicate that one or more sets of words from the plurality of words are unclear; and
determining an order for the identified attribute and the one or more additional attributes, wherein the order determines an order in which to clarify the identified attribute and the one or more attributes.

27. A computer-program product tangibly embodied in a non-transitory machine-readable storage medium, including instructions that, when executed by one or more processors, cause the one or more processors to:
receive input, wherein the input is associated with an interaction with a computing device, and wherein the input includes dialog input, application input, or sensor input;
determine an interaction history, wherein determining includes adding the input to the interaction history, wherein adding includes using an artificial intelligence-based model to combine the input with prior interaction history;
determine a current context, wherein the current context is associated with an interaction with the computing device, and wherein the interaction includes dialog input, application input, or sensor input;
receive verbal input, wherein the verbal input includes natural language, and wherein the verbal input includes a plurality of words;
interpret the verbal input, wherein interpreting the verbal input includes assigning one or more attributes to the plurality of words;
identify an attribute from the one or more attributes, wherein the identified attribute is associated with one or more words from the plurality of words, wherein the identified attribute indicates that the one or more words are unclear, and wherein a word is unclear when the computing system cannot recognize the word;
determine that the current context and the interaction history do not clarify the one or more words;
determine a type of information needed to recognize the one or more words, wherein determining includes using the one or more attributes assigned to the one or more words to identify missing information;
determine a clarification question for the one or more words, wherein determining includes using the type of information, the current context, and the interaction history, wherein the clarification question is formatted to request the missing information, and wherein the format is customized using the current context and the interaction history; and
output the clarification question.

28. The computer-program product of claim 27, wherein application input includes data or instructions output by an application executing on the computing device.

29. The computer-program product of claim 27, wherein the sensor input is generated automatically.

30. The computer-program product of claim 27, further comprising instructions that, when executed by the one or more processors, cause the one or more processors to:
receive non-verbal input, wherein the non-verbal input includes a physical motion interpreted from a sensor associated with the computing device, and wherein the current context includes the non-verbal input.

31. The computer-program product of claim 27, further comprising instructions that, when executed by the one or more processors, cause the one or more processors to:
receive additional verbal input;
determine that the additional verbal input includes the missing information.

32. The computer-program product of claim 27, further comprising instructions that, when executed by the one or more processors, cause the one or more processors to:
receive additional verbal input;
filter one or more non-responsive portions of the additional verbal input; and
extract the missing information from the filtered additional verbal input.

33. The computer-program product of claim 27, further comprising instructions that, when executed by the one or more processors, cause the one or more processors to:
receive additional verbal input;
filter one or more non-responsive portions of the additional verbal input; and
determine that no part of the filtered additional verbal input includes the missing information.

34. The computer-program product of claim 33, further comprising instructions that, when executed by the one or more processors, cause the one or more processors to:
determine a second clarification question, wherein the second clarification question is different from the clarification question for the one or more words; and
output the second clarification question.

35. The computer-program product of claim 27, further comprising instructions that, when executed by the one or more processors, cause the one or more processors to:
receive additional verbal input;
use the additional verbal input, the current context, and the interaction history to determine an action; and
execute the action, wherein the action modifies an operation of the computing device.

36. The computer-program product of claim 35, wherein using the additional verbal input includes modifying the verbal input to include the additional verbal input.

37. The computer-program product of claim 35, wherein using the additional verbal input includes generating new verbal input, wherein the new verbal input combines the verbal input and the additional verbal input.

38. The computer-program product of claim 27, wherein the interaction history includes a clarification history, wherein the clarification history includes one or more previous clarification questions, and wherein determining the clarification question further includes using the clarification history.

39. The computer-program product of claim 27, further comprising instructions that, when executed by the one or more processors, cause the one or more processors to:
determine one or more additional attributes from the one or more attributes, wherein the one or more attributes indicate that one or more sets of words from the plurality of words are unclear; and
determine an order for the identified attribute and the one or more additional attributes, wherein the order determines an order in which to clarify the identified attribute and the one or more attributes.

* * * * *